US012724386B2

(12) United States Patent
Sekiai et al.

(10) Patent No.: US 12,724,386 B2
(45) Date of Patent: Sep. 1, 2026

(54) CONTROL DEVICE AND CONTROL METHOD THAT PREDICTS A FUTURE STATE OF THE CONTROL TARGET USING A MODEL SEGMENTED BY THE SEGMENTATION UNIT AND CALCULATES A CONTROL POLICY OF THE CONTROL TARGET BASED ON THE PREDICTED FUTURE STATE

(71) Applicant: HITACHI, LTD., Tokyo (JP)

(72) Inventors: Takaaki Sekiai, Tokyo (JP); Yuya Tokuda, Tokyo (JP); Takuya Yoshida, Tokyo (JP)

(73) Assignee: HITACHI, LTD., Tokyo (JP)

( * ) Notice: Subject to any disclaimer, the term of this patent is extended or adjusted under 35 U.S.C. 154(b) by 526 days.

(21) Appl. No.: 18/035,771

(22) PCT Filed: Aug. 30, 2021

(86) PCT No.: PCT/JP2021/031806
§ 371 (c)(1),
(2) Date: May 8, 2023

(87) PCT Pub. No.: WO2022/102213
PCT Pub. Date: May 19, 2022

(65) Prior Publication Data

US 2023/0400821 A1 Dec. 14, 2023

(30) Foreign Application Priority Data

Nov. 16, 2020 (JP) ................................ 2020-190354

(51) Int. Cl.
*G05B 13/04* (2006.01)

(52) U.S. Cl.
CPC ................................ *G05B 13/048* (2013.01)

(58) Field of Classification Search
CPC .................................................. G05B 13/048
(Continued)

(56) References Cited

U.S. PATENT DOCUMENTS

2008/0306890 A1* 12/2008 Eguchi .............. G05B 13/0265 706/12
2013/0204436 A1* 8/2013 Kim ....................... G06F 17/00 901/47
2020/0393800 A1 12/2020 Tokuda et al.

FOREIGN PATENT DOCUMENTS

JP 06-95707 A 4/1994
JP 11-161327 A 6/1999
(Continued)

OTHER PUBLICATIONS

International Search Report of PCT/JP2021/031806 dated Sep. 28, 2021.

(Continued)

*Primary Examiner* — Jigneshkumar C Patel
(74) *Attorney, Agent, or Firm* — MATTINGLY & MALUR, PC

(57) ABSTRACT

This control device 10 comprises a model construction unit 11 that constructs a model for simulating a control object 20, a problem subdivision unit 12 that subdivides the model constructed by the model construction unit 11, a control measure calculation unit 13 that predicts the future status of the control object 20 using the model subdivided by the problem subdivision unit 12 and that calculates a control measure for the control object 20 on the basis of the predicted future status, and an operation command generation unit 14 that generates operation commands to the control object 20 on the basis of the control measure calculated by the control measure calculation unit 13.

8 Claims, 8 Drawing Sheets

(58) Field of Classification Search
USPC .......................................................... 700/29
See application file for complete search history.

(56) References Cited

FOREIGN PATENT DOCUMENTS

| | | | |
|---|---|---|---|
| JP | 2011-197705 | A | 10/2011 |
| JP | 2019-10614 | A | 1/2019 |
| JP | 2019-159876 | A | 9/2019 |
| WO | 2019/176370 | A1 | 9/2019 |

OTHER PUBLICATIONS

Japanese Office Action received in corresponding Japanese Application No. 2020-190354 dated Dec. 5, 2023.
Chinese Office Action received in corresponding Chinese Application No. 202180073239.X dated Aug. 26, 2025.

* cited by examiner 30
20
31
311
32
22
21
KEYBOARD
MOUSE
DISPLAY DEVICE
DEVICE CONTROL UNIT
DEVICE
312
1
2
10
6
17
18
EXTERNAL INPUT INTERFACE
EXTERNAL OUTPUT INTERFACE
15
2
1
6
14
MEASUREMENT SIGNAL DB
151
152
OPERATION DATA DB
IMAGE DATA DB
OPERATION COMMAND GENERATION UNIT
2
11
7
MODEL CONSTRUCTION UNIT
16
PROCESSING RESULT DB
3
5
13
12
CONTROL POLICY CALCULATION UNIT
PROBLEM SEGMENTATION UNIT
4

| TIME | ITEM A | ITEM B | ITEM C | ... |
|---|---|---|---|---|
| 0:00 | 600 | 100 | 100 | ... |
| 0:01 | 600 | 101 | 101 | ... |
| 0:02 | 600 | 102 | 102 | ... |
| 0:03 | 602 | 101 | 103 | ... |
| ⋮ | ⋮ | ⋮ | ⋮ | ⋮ |

NUMBER OF JOINTS 1

NUMBER OF JOINTS 3

| | | STATE ID OF TRANSITION DESTINATION (sj) | | | | | | | |
|---|---|---|---|---|---|---|---|---|---|
| | | s1 | s2 | s3 | s4 | s5 | s6 | s7 | s8 |
| STATE ID OF TRANSITION SOURCE (si) | s1 | T11 | T12 | T13 | T14 | 0 | 0 | 0 | 0 |
| | s2 | T21 | T22 | T23 | T24 | 0 | 0 | 0 | 0 |
| | s3 | T31 | T32 | T33 | T34 | 0 | 0 | 0 | 0 |
| | s4 | T41 | T42 | T43 | T44 | T45 | 0 | 0 | 0 |
| | s5 | 0 | 0 | 0 | T54 | T55 | T56 | T57 | T58 |
| | s6 | 0 | 0 | 0 | 0 | T65 | T66 | T67 | 0 |
| | s7 | 0 | 0 | 0 | 0 | T75 | T76 | T77 | T78 |
| | s8 | 0 | 0 | 0 | 0 | T85 | 0 | T87 | T88 |

Tij

FIG. 5B

| | | STATE ID OF TRANSITION DESTINATION (sj) | | | |
|---|---|---|---|---|---|
| | | s1 | s2 | s3 | s4 |
| STATE ID OF TRANSITION SOURCE (si) | s1 | T11 | T12 | T13 | T14 |
| | s2 | T21 | T22 | T23 | T24 |
| | s3 | T31 | T32 | T33 | T34 |
| | s4 | T41 | T42 | T43 | T44 |

Tij

FIG. 5C

| | | STATE ID OF TRANSITION DESTINATION (sj) | | | |
|---|---|---|---|---|---|
| | | s5 | s6 | s7 | s8 |
| STATE ID OF TRANSITION SOURCE (si) | s5 | T55 | T56 | T57 | T58 |
| | s6 | T65 | T66 | T67 | 0 |
| | s7 | T75 | T76 | T77 | T78 |
| | s8 | T85 | 0 | T87 | T88 |

Tij

FIG. 5D

| | | STATE ID OF TRANSITION DESTINATION (sj) | |
|---|---|---|---|
| | | s4 | s5 |
| STATE ID OF TRANSITION SOURCE (si) | s4 | T44 | T45 |
| | s5 | T54 | T55 |

Tij

FIG. 6A

| STATE ID OF TRANSITION SOURCE (si) | s1 | s2 | s3 | s4 | ··· | s8 |
|---|---|---|---|---|---|---|
| REWARD | 0.00 | 0.00 | 1.00 | 0.00 | ··· | 0.00 |

FIG. 6B

| STATE ID OF TRANSITION SOURCE (si) | s1 | s2 | s3 | s4 | ··· | s8 |
|---|---|---|---|---|---|---|
| OPERATION AMOUNT ID (ac) | a1 | a2 | a3 | a4 | ··· | am |

FIG. 6C

| STATE ID OF TRANSITION SOURCE (si) | s1 | s2 | s3 | s4 | ··· | s8 |
|---|---|---|---|---|---|---|
| VALUE | 0.89 | 0.90 | 1.00 | 0.90 | ··· | 0.01 |

FIG. 6D

| STATE ID OF TRANSITION SOURCE (si) | s1 | s2 | s3 | s4 | ··· | s8 |
|---|---|---|---|---|---|---|
| STATE ID OF TRANSITION DESTINATION (sj) | s3 | s3 | s3 | s3 | ··· | s5 |

FIG. 7

CONTROL DEVICE AND CONTROL METHOD THAT PREDICTS A FUTURE STATE OF THE CONTROL TARGET USING A MODEL SEGMENTED BY THE SEGMENTATION UNIT AND CALCULATES A CONTROL POLICY OF THE CONTROL TARGET BASED ON THE PREDICTED FUTURE STATE

TECHNICAL FIELD

The present invention relates to a control device and a control method.

The present application claims priority based on Japanese Patent Application No. 2020-190354 filed on Nov. 16, 2020, the contents of which are incorporated herein by reference.

BACKGROUND ART

In the fields of power generation and industrial plants, a control device incorporating machine learning is employed in order to perform operation optimizing an operation state of a plant. As an example, PTL 1 discloses a control device including a future state prediction device that can quickly predict a state of a control target and its surrounding environment in infinite time or an infinite step ahead in a space of a predefined finite state in a form of probability density distribution. The future state prediction device includes a future state prediction calculation unit that performs calculation equivalent to a series using a model that simulates a future state of a control target and its surrounding environment in a form of probability density distribution, and a control law calculation unit that calculates an operation amount of a control target using a result of a state of the control target and its surrounding environment in infinite time or an infinite step ahead predicted by the future state prediction calculation unit.

CITATION LIST

Patent Literature

PTL 1: JP 2019-159876 A

SUMMARY OF INVENTION

Technical Problem

When the control device disclosed in PTL 1 is applied to a control target such as a plant, calculation for predicting a future state by the future state prediction calculation unit is required. However, a state of the control target and its surrounding environment is already defined in the form of probability density distribution and if the state of the control target and its surrounding environment is defined in more detail, a large amount of memory is required for calculation of predicting a future state. As a result, memory of a control device is insufficient, and there is a possibility that a problem that a future state cannot be predicted occurs.

Therefore, an object of the present invention is to provide a control device and a control method capable of reducing memory used for prediction of a future state.

Solution to Problem

A control device according to the present invention includes a model construction unit that constructs a model that simulates a control target, a segmentation unit that segments a model constructed by the model construction unit, a control policy calculation unit that predicts a future state of the control target using a model segmented by the segmentation unit and calculates a control policy of the control target based on the predicted future state, and an operation command generation unit that generates an operation command to the control target based on a control policy calculated by the control policy calculation unit.

Since the control device according to the present invention includes the segmentation unit that segments a model constructed by the model construction unit, it is possible to reduce memory used for prediction of a future state by segmenting a model and then predicting a future state of a control target.

Advantageous Effects of Invention

According to the present invention, memory used for prediction of a future state can be reduced.

BRIEF DESCRIPTION OF DRAWINGS

FIG. 5B is a diagram for explaining a state transition probability matrix.

FIG. 5C is a diagram for explaining a state transition probability matrix.

FIG. 5D is a diagram for explaining a state transition probability matrix.

FIG. 6A is a diagram for explaining operation of a control policy calculation unit.

FIG. 6B is a diagram for explaining operation of the control policy calculation unit.

FIG. 6C is a diagram for explaining operation of the control policy calculation unit.

FIG. 6D is a diagram for explaining operation of the control policy calculation unit.

FIG. 7 is an example of a memory use state displayed on a display device.

DESCRIPTION OF EMBODIMENTS

Hereinafter, an embodiment of a control device and a control method according to the present invention will be described with reference to the drawings.

Figure 1:
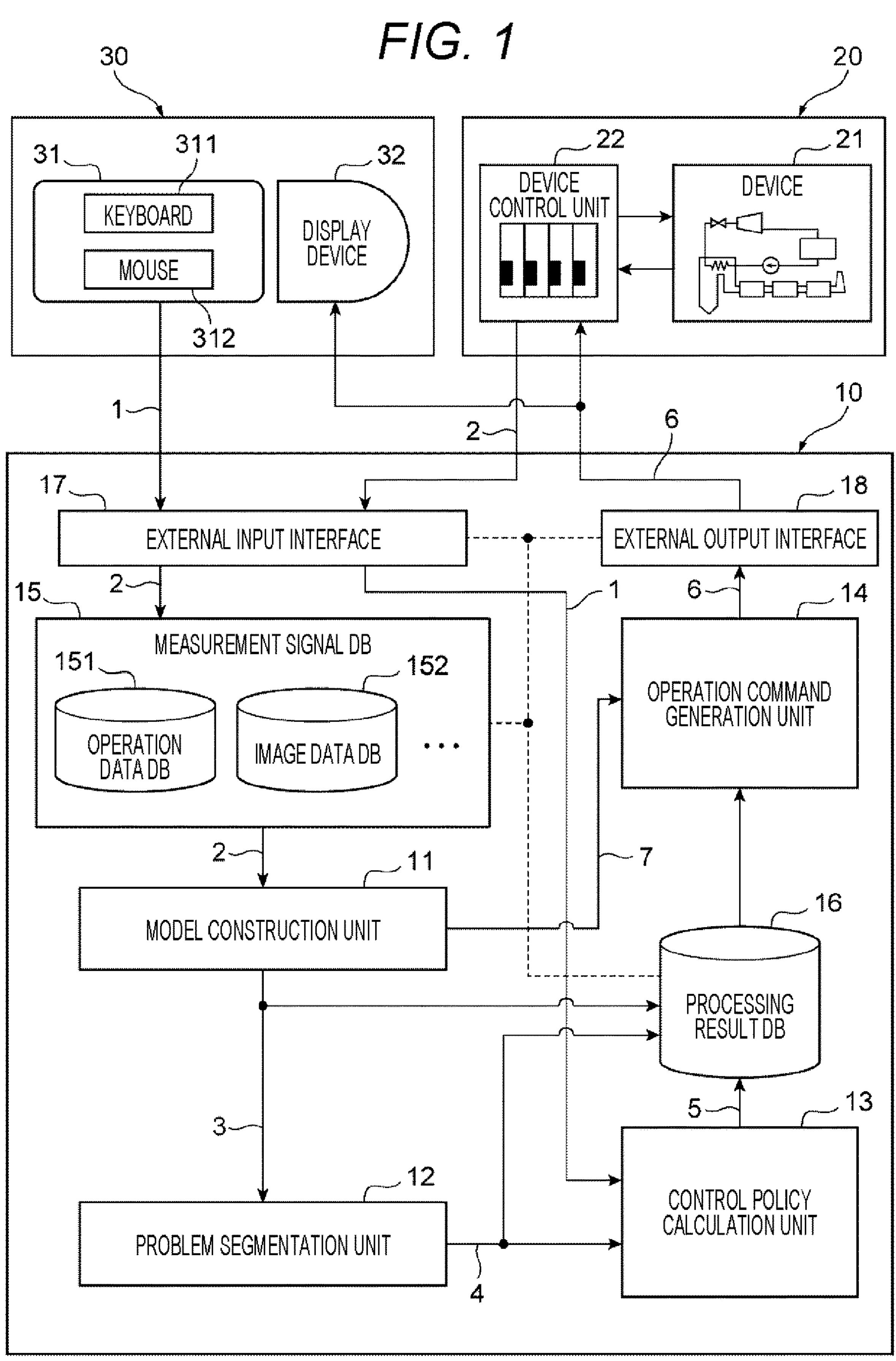
FIG. 1 is a schematic configuration diagram illustrating a control device according to an embodiment and a related device related to the control device.

FIG. 1 is a schematic configuration diagram illustrating a control device according to an embodiment and a related device related to the control device. A control device 10 of the present embodiment is a device that calculates a control policy of a control target 20 on the basis of a future state in infinite time or an infinite step ahead using a model that simulates an entire characteristic of the control target 20, and generates an operation command to the control target 20 according to the calculated control policy. As illustrated in FIG. 1, the control device 10 is connected to the control target 20 and an external device 30. The control target 20 and the external device 30 correspond to the related device described above.

The control target 20 includes, for example, a device 21 constituting a power plant or the like, and a device control unit 22 that controls the device 21. Although not illustrated, the device 21 includes sensors that acquire operation data and image data of the device 21. Operation data and image data acquired by the sensors are output to the device control unit 22. The device control unit 22 generates each operation command on the basis of these pieces of operation data and image data, and outputs the generated operation command to the device 21 to perform control of the device 21.

The external device 30 is, for example, a computer device (computer), and includes an external input device 31 having a keyboard 311 and a mouse 312, and a display device 32 having a monitor capable of displaying an image and data. The external device 30 may be a portable terminal such as a tablet, a smartphone, or a notebook PC in addition to a computer.

In the present embodiment, the control device 10 and the control target 20, and the control device 10 and the external device 30 can communicate with each other via a network. Specifically, the external device 30 transmits an instruction input via the external input device 31 to the control device 10 as an external input signal 1. The control target 20 transmits operation data and image data of the device 21 and an operation command generated by the device control unit 22 to the control device 10 as a measurement signal 2. Then, the control device 10 performs each piece of processing based on the transmitted external input signal 1 and measurement signal 2, further generates an operation command 6, and transmits the generated operation command 6 to the device control unit 22 of the control target 20 and the display device 32 of the external device 30.

The control device 10 includes, for example, a microcomputer formed by combining a central processing unit (CPU) that executes calculation, a read only memory (ROM) as a secondary storage device that stores a program for calculation, and a random access memory (RAM) as a temporary storage device that stores calculation progress and a temporary control variable, and performs each piece of processing such as calculation and determination by executing the stored program. Note that the program here may be transmitted to the control device 10 via a network.

The control device 10 mainly includes a model construction unit 11, a problem segmentation unit 12, a control policy calculation unit 13, an operation command generation unit 14, a measurement signal database 15, and a processing result database 16. In FIG. 1, the database is indicated by DB. Further, the control device 10 includes an external input interface 17 and an external output interface 18 as interfaces connected to the outside. The control device 10 performs transmission to and receiving from the control target 20 and the external device 30 via these interfaces.

The model construction unit 11 constructs a model that simulates the control target 20. More specifically, the model construction unit 11 constructs a simulation model of the control target 20 by generating model data that simulates the entire characteristic of the control target 20. Further, the model construction unit 11 outputs generated model data to the problem segmentation unit 12 and stores the generated model data in the processing result database 16.

The problem segmentation unit 12 corresponds to a "segmentation unit" described in the claims, and segments a model constructed by the model construction unit 11. More specifically, the problem segmentation unit 12 segments model data generated by the model construction unit 11, outputs the segmented model data to the control policy calculation unit 13, and stores the segmented model data in the processing result database 16.

The control policy calculation unit 13 predicts a future state of the control target 20 using a model segmented by the problem segmentation unit 12, and calculates a control policy of the control target 20 based on the predicted future state. More specifically, based on model data segmented by the problem segmentation unit 12 and the external input signal 1 received via the external input interface 17, the control policy calculation unit 13 predicts all future states in infinite time or an infinite step ahead, and calculates a control policy of the control target 20 from the predicted future state. Furthermore, the control policy calculation unit 13 stores the calculated control policy in the processing result database 16. Note that, although details will be described later, the control policy here means processing of generating an operation command to the control target 20.

The operation command generation unit 14 generates an operation command to the control target 20 based on a control policy calculated by the control policy calculation unit 13. More specifically, the operation command generation unit 14 acquires a control policy calculated by the control policy calculation unit 13 and stored in the processing result database 16, and generates an operation command to the control target 20 according to the acquired control policy. Furthermore, the operation command generation unit 14 transmits the generated operation command to the device control unit 22 of the control target 20 and the display device 32 of the external device 30 via the external output interface 18.

The measurement signal database 15 receives and stores the measurement signal 2 transmitted from the control target via the external input interface 17. The measurement signal 2 includes operation data, image data, and the like of the control target 20. In a manner corresponding to this, the measurement signal database 15 includes an operation database 151 that stores operation data of the control target an image database 152 that stores image data of the control target 20, and the like. Note that data included in the measurement signal 2 is not limited to operation data and image data.

In the operation database 151 and the image database 152, electronic information is stored, and information is normally stored in a form called an electronic file (electronic data). Further, these databases may be provided outside the control device 10 and may be configured to be connectable to the control device 10 via a network.

Hereinafter, a control method of the control device 10 (that is, operation of the control device 10) will be described with reference to FIGS. 2 to 6D. In description below, an overall process of operation of the control device will be first described with reference to FIG. 2, and then details will be described in detail with reference to FIGS. 3A to 6D.

Figure 2:
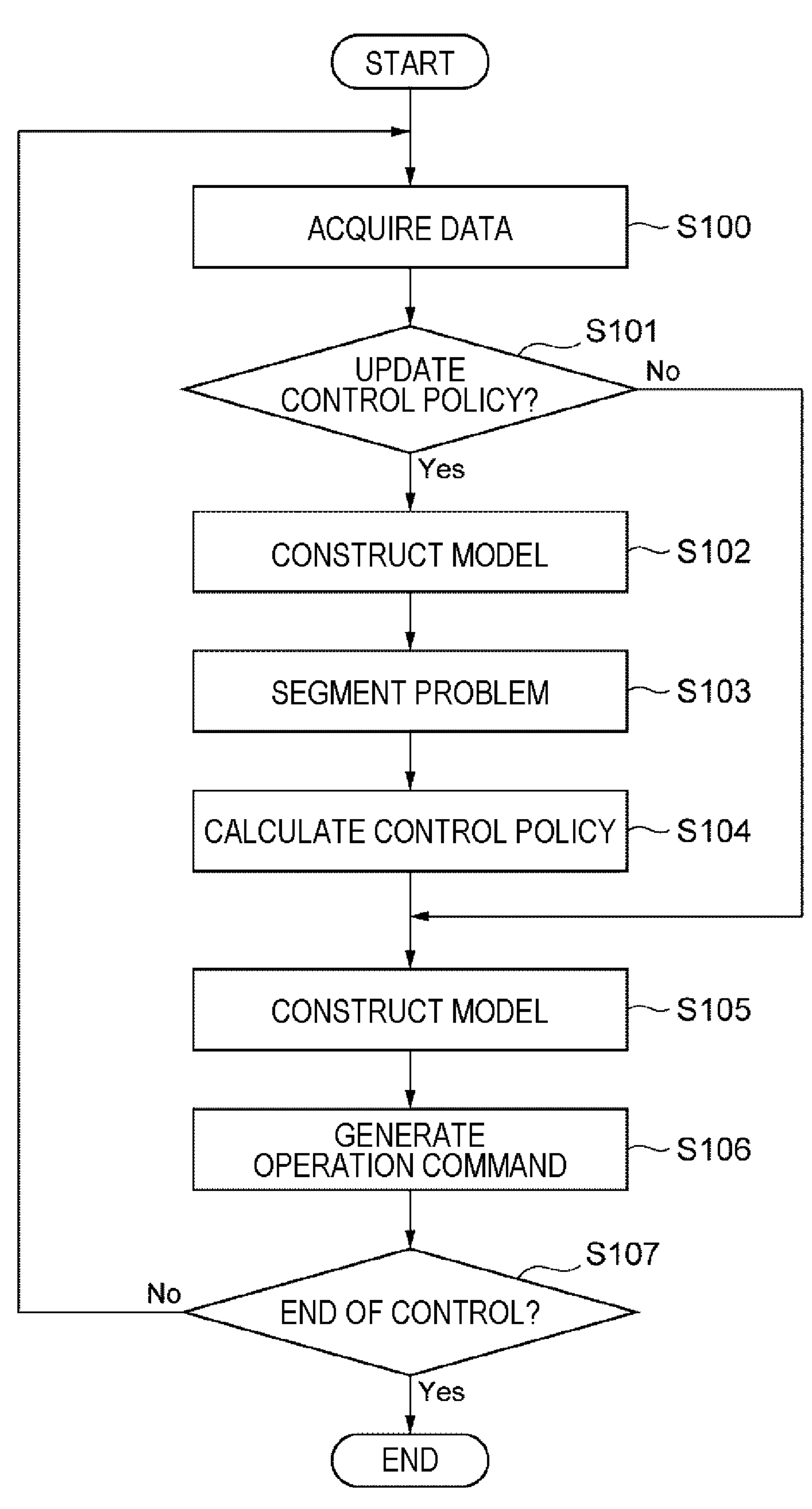
FIG. 2 is a flowchart illustrating a control method of a control device.

FIG. 2 is a flowchart illustrating the control method of the control device. As illustrated in FIG. 2, first, in Step S100, the control device 10 receives the measurement signal 2 transmitted from the control target 20 via the external input interface 17, and stores the received measurement signal 2 in the measurement signal database 15. The measurement signal 2 includes time-series operation data, image data, and the like related to the device 21 of the control target 20. By the above, the control device 10 acquires time-series operation data and image data related to the device 21. Then, the operation data is stored in the operation database 151, and the image data is stored in the image database 152.

Figures 3A, 3B:
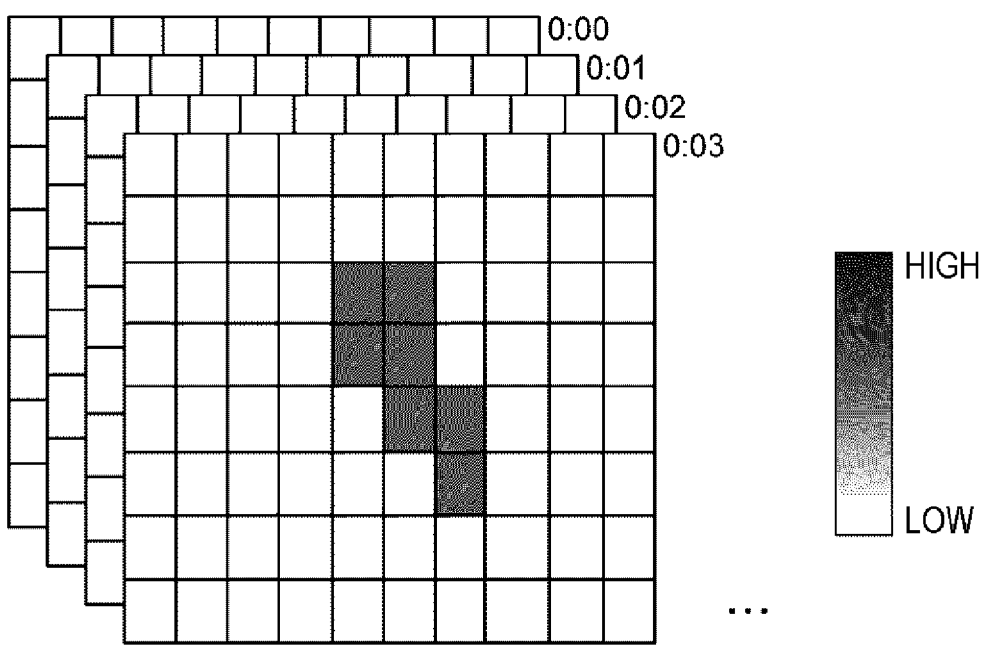
FIG. 3A is a diagram explaining a mode of data stored in a measurement signal database.
FIG. 3B is a diagram explaining a mode of data stored in the measurement signal database.

FIGS. 3A and 3B are diagrams for explaining a mode of data stored in the measurement signal database. FIG. 3A is an example illustrating operation data stored in the operation database 151, and FIG. 3B is an example illustrating image data stored in the image database 152. As illustrated in FIG. 3A, in the operation database 151, for example, time-series data for each data item (Item A, Item B, Item C, . . . ) is stored for each sampling period. Item A is, for example, temperature, Item B is flow rate, and Item C is pressure. Further, as illustrated in FIG. 3B, in the image database 152, for example, distribution of temperature measured in a certain cross section of the device 21 is stored for each sampling period. Note that operation data and image data of the control target 20 can be displayed on the display device 32.

In Step S100, the control device 10 also receives the external input signal 1 transmitted from the external device via the external input interface 17, and acquires data included in the received external input signal 1. The external input signal 1 received via the external input interface 17 is output to the control policy calculation unit 13.

In Step S101 following Step S100, the control device determines whether or not to update a control policy on the basis of a predetermined condition. In a case where the control policy is determined to be updated, the processing proceeds to Step S102. On the other hand, in a case where the control policy is determined not to be updated, the processing proceeds to Step S105. Here, as the predetermined condition, for example, there is considered whether or not a characteristic of a model created by the model construction unit 11 matches a characteristic of the control target 20 when measurement data for a certain period (for example, one week) is newly accumulated. If they match, the control policy is determined not to be updated, and if they do not match, the control policy is determined to be updated. Note that the predetermined condition is not limited to this content, and may be optionally set.

In Step S102, the model construction unit 11 acquires the measurement signal 2 stored in the measurement signal database 15, and generates model data 3 based on the acquired measurement signal 2. The generated model data 3 is output to the problem segmentation unit 12 and stored in the processing result database 16.

In Step S103 following Step S102, the problem segmentation unit 12 segments the model data 3 generated by the model construction unit 11 to generate segmented model data 4. The generated segmented model data 4 is output to the control policy calculation unit 13 and stored in the processing result database 16. Note that details of Step S102 related to model construction and Step S103 related to problem segmentation will be described later with reference to FIGS. 4A to 5D.

In Step S104 following Step S103, the control policy calculation unit 13 generates a control policy signal 5 by calculating a control policy on the basis of a reward function included in the external input signal 1 received via the external input interface 17 and the segmented model data 4 generated by the problem segmentation unit 12. The generated control policy signal 5 is stored in the processing result database 16. Details of Step S104 related to the control policy calculation will be described later with reference to FIGS. 6A to 6D.

In Step S105, the model construction unit 11 generates a state ID 7 based on the measurement signal 2 at a current time. The generated state ID 7 is output to the operation command generation unit 14.

In Step S106 following Step S105, the operation command generation unit 14 acquires the control policy signal 5 stored in the processing result database 16, and generates the operation command 6 to the control target 20 using the acquired control policy signal 5 and the state ID 7 generated by the model construction unit 11. The generated operation command 6 is transmitted to the device control unit 22 of the control target 20 and the display device 32 of the external device 30 via the external output interface 18. Note that, as a method of generating an operation command based on a control policy signal and a state ID, a well-known technique may be used, and details of the technique will be omitted.

In the control target 20, the device control unit 22 controls the device 21 according to the transmitted operation command 6. By using the control device 10 in this manner, it is possible to control a measurement value of temperature, a flow rate, pressure, and the like of the device 21, and distribution of temperature to an optimum state. On the other hand, in the external device 30, the display device 32 displays content of the transmitted operation command 6 and an image such as a trend graph on a monitor. An operator can check the content of the operation command 6 by viewing the content displayed on the monitor.

In Step S107 following Step S106, the control device 10 determines whether or not to end the control. In a case where the control is determined not to be ended (in other words, in a case where the control is continued), the processing returns to Step S100. On the other hand, in a case where the control is determined to be ended, a series of the processing ends.

Next, Step S102 related to model construction and Step S103 related to problem segmentation will be described in detail with reference to FIGS. 4A to 5D.

In the present embodiment, an example in which the model construction unit 11 constructs a model for the control target 20 including the device 21 and the device control unit 22 will be described. However, an example of the control target 20 only needs to be behavior of a machine and a living organism, nature and a physical phenomenon, a chemical reaction, a fluctuation in money and a price, a change in demand of consumers, and the like, and is not limited to the example described here.

Further, in the present embodiment, input of a model is a state of a simulation target (that is, control target) and an influence factor such as lapse of time, operation, and disturbance, and output of a model is a state of a simulation target after being affected by an influence factor. As a form of a model constructed by the model construction unit 11, a neural network, a radial basis function network, a matrix representing a weight of a neural network and a radial basis function network, or a state transition probability matrix is considered, but the form is not limited to these matrices.

As a construction method of a model in a case of using a state transition probability matrix, for example, the content disclosed in PTL 1 described above can be used. That is, although data is discretized with reference to a table defining a state ID from measurement data (in the present embodiment, data included in the measurement signal 2 of the control target 20) of a simulation target, data may be discretized using a data clustering method such as vector quantization or adaptive resonance theory. In this way, a simulation model of the control target 20 can be suitably constructed by selectively using these methods according to a situation of a control target. Note that, at this time, the model construction unit 11 only need to define a state of a state transition matrix by discretizing at least one of operation data and image data included in the measurement signal 2 using table reference, adaptive resonance theory, or a vector quantization method. Further, when data is discretized here, variation in reward included in one state ID is preferably small.

Figure 4A:
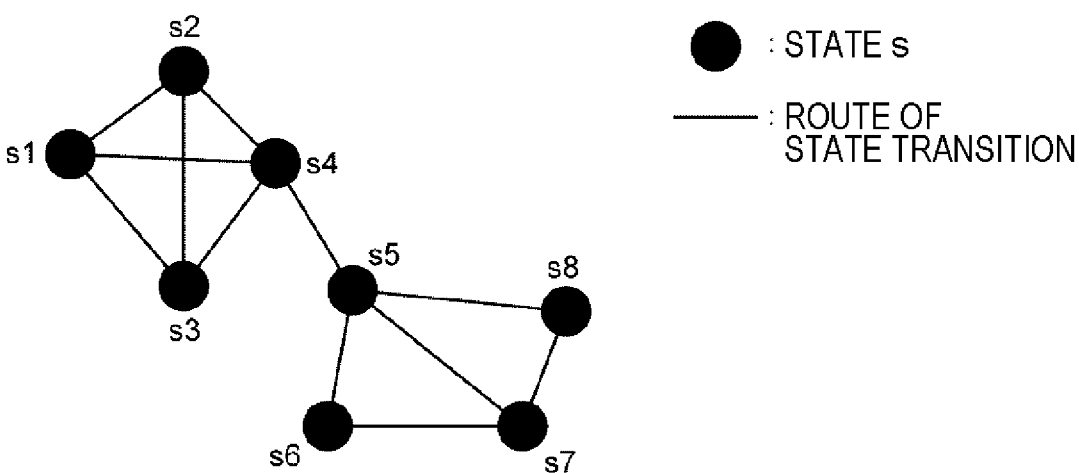
FIG. 4A is a diagram for explaining operation of a model construction unit and a problem segmentation unit.

Hereinafter, a case where the model construction unit 11 constructs a state transition probability model (Step S102) will be described. In FIG. 4A, s1 to s8 represent states of a state transition probability model, and states that can transition in time of Δt are connected by a line. For example, it is possible to transition from the state s1 to any of the states s1, s2, s3, and s4. Therefore, the model construction unit 11 defines a state of a state transition matrix on the basis of information (here, the measurement signal 2) acquired from the measurement signal database 15, and grasps and models a relationship between states that can transition in the time of Δt.

Figure 4B:
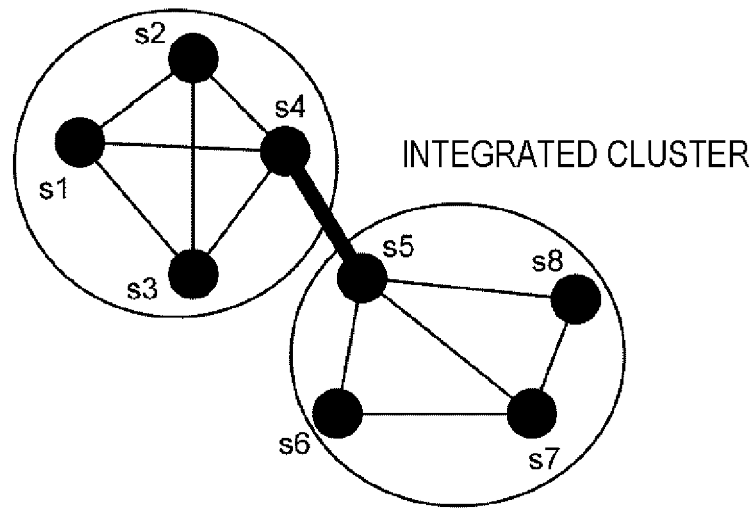
FIG. 4B is a diagram for explaining operation of the model construction unit and the problem segmentation unit.
Figures 4C, 5A:
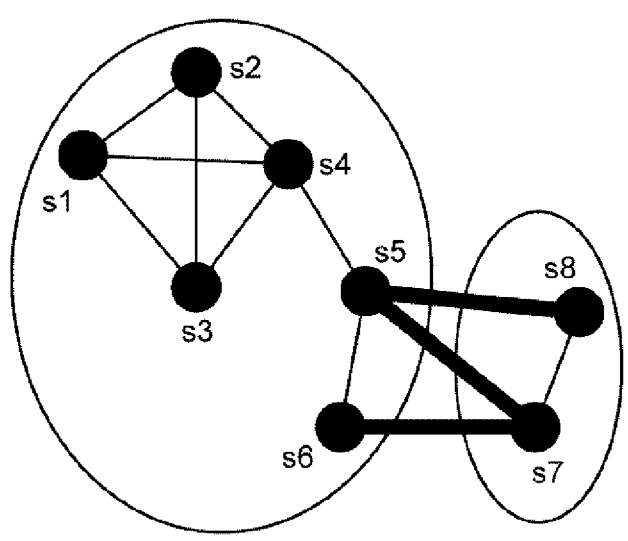
FIG. 4C is a diagram for explaining operation of the model construction unit and the problem segmentation unit.
FIG. 5A is a diagram for explaining a state transition probability matrix.

FIGS. 4B and 4C are diagrams explaining an image in which the problem segmentation unit 12 segments a model (Step S103). Here, the problem segmentation unit 12 segments the entire model into a plurality of models by grouping a plurality of states into one integrated cluster. In the present invention, dividing a model is used interchangeably with segmenting a problem. Note that the problem segmentation unit 12 can segment a problem so that the number of states in an integrated cluster falls within a predetermined range, or can optionally segment a problem by an operator.

In the example of FIG. 4B, the problem segmentation unit 12 segments a problem into two problems (see two circles in FIG. 4B) by integrating the states s1 to s4 and s5 to s8. In the example of FIG. 4C, the problem segmentation unit 12 segments a problem into two problems (see two circles in FIG. 4C) by integrating the states s1 to s6 and s7 to s8. In both the examples, an integrated cluster is divided into two, that is, the entire problem is divided into two problems and learned.

Here, the problem segmentation unit 12 preferably segments a model so that the number of joints coupling integrated clusters is as small as possible. For example, the number of joints is one in the example illustrated in FIG. 4B, and the number of joints is three in the example illustrated in FIG. 4C, and the number of joints in FIG. 4B is smaller than that in FIG. 4C. Therefore, it is better to segment a problem as illustrated in FIG. 4B. This is because, as the number of joints decreases, the number of elements of a state transition matrix decreases, so that memory for storing models segmented by the problem segmentation unit 12 can be reduced. In this manner, memory used for prediction of a future state can be reduced.

Note that the method of segmentation by the problem segmentation unit 12 is not limited to the above contents as long as the entire model can be divided into a plurality of pieces.

FIGS. 5A to 5D are diagrams illustrating a state transition probability matrix. The state transition probability matrix is generally a kind of a model that simulates a motion characteristic and a physical phenomenon of a control target, and is a function or matrix that stores transition probability between all states. In FIGS. 5A to 5D, a row of a table is a state si (i=1, 2, . . . n (where n=8)) of a transition source, a column of the table is a state sj (j=1, 2, . . . , n (where n=8)) of a transition destination, and an element Tij is state transition probability P (sj|si) of transitioning from the state si to the state sj when the preset step time Δt (or step) elapses. Note that, in a case where the state transition probability P (sj|si) does not depend on time, a step indicating an amount or the number of times of an influencing factor interfering with a simulation target may be used instead of time.

FIG. 5A illustrates a model simulating an entire characteristic of a control target, and is a state transition probability matrix corresponding to FIG. 4A. In FIG. 5A, probability of transition from the states s1 to s8 as transition sources to the states s1 to s8 as transition destinations is indicated by Tij. FIGS. 5B to 5D illustrate a problem segmented model (segmented model), and are state transition probability matrices after a model is segmented as illustrated in FIG. 4B. That is, FIGS. 5B to 5D are matrices showing integrated clusters and a relationship between the integrated clusters as illustrated in FIG. 4B.

Then, in the state transition probability matrix of FIG. 5A, there are 8×8=64 of elements, whereas FIGS. 5B to 5D use 4×4+4×4+2×2=36 of elements in total. As described above, since the number of elements in a matrix can be reduced by segmenting a model and defining a state transition probability matrix, memory required to store the matrix can be reduced. Therefore, memory for storing models segmented by the problem segmentation unit 12 can be reduced, and memory used for prediction of a future state can be reduced.

Note that, in FIGS. 4A to 5D, the case where the number of states is eight is described, but there is no restriction on the number of states. As the number of states increases, the effect of reducing memory required to store a matrix becomes more remarkable, and the control device 10 can be easily applied to the control target 20.

Next, Step S104 related to control policy calculation will be described in detail with reference to FIGS. 6A to 6D. As described above, the control policy calculation unit 13 predicts all future states in infinite time or an infinite step ahead using the segmented model data 4, and calculates the control policy signal 5 of the control target 20 based on the predicted future state.

Specifically, first, the control policy calculation unit 13 predicts a future state by calculating an attenuation-type state transition matrix using models of state transition probability segmented by the problem segmentation unit 12. As a method of calculating the attenuation-type state transition matrix, for example, Equation (1) below can be used. In Equation (1), a storage form of a model is assumed to be a state transition probability matrix T.

[Math. 1]

$$D=T+\gamma T^2+\gamma T^3+\ldots+\gamma^{\infty-1}T^{\infty} \quad (1)$$

In Equation (1), D is an attenuation-type state transition matrix, and γ is a decay rate and is a constant of 0 or more and less than 1. Further, $T^k$ is a function (or matrix) that stores transition probabilities between all states when time of Δt×k elapses. As described above, the attenuation-type state transition matrix D is the sum from the state transition probability matrix T after time Δt elapses to the state transition probability matrix $T^{\infty}$ after time Δt×∞ elapses, and is also a matrix that stores statistical proximity between all states. Further, in order to reduce a weight for a state that transitions in a more distant future, the decay rate γ is multiplied according to elapsed time. Here, k is a discretized positive integer.

In Equation (1), which requires calculation from the state transition probability matrix T to the state transition probability matrix $T^\infty$, calculation within real time is difficult. In view of the above, Equation (1) is converted into Equation (2) below.

[Math. 2]

$$D=T(E-\gamma T)^{-1} \quad (2)$$

In Equation (2), E is a unit matrix. Equation (2) is a calculation formula equivalent to Equation (1). By converting the calculation of the sum from the state transition probability matrix T to the state transition probability matrix $T^\infty$ in Equation (1) into an inverse matrix of (E−γT) in Equation (2), the same calculation result as Equation (1) is obtained in finite time. Here, in a case where the state transition probability matrix T is not linearly independent, a pseudo inverse matrix may be used. Further, instead of the attenuation-type state transition matrix D, a matrix obtained by normalizing the attenuation-type state transition matrix in each row may be used.

As described above, state transition probability after time Δt×k is calculated by calculation of $T^k$ by using a model that simulates behavior of a simulation target as a state transition model. Further, the sum from the state transition probability matrix T after a lapse of the time Δt to the state transition probability matrix $T^\infty$ after time Δt×∞ elapses is taken, and weighting is performed with the decay rate γ according to the elapsed time, so that state transition probability in consideration of lapse of the time Δt×∞ can be calculated within finite time.

Next, the control policy calculation unit 13 calculates a control policy on the basis of a reward function included in the external input signal 1. Here, the reward function is a function in which control targets such as a target position and a target speed are expressed in the form of a function, a table, a vector, a matrix, and the like.

FIG. 6A illustrates an example of a case where the reward function is in a vector format. In FIG. 6A, a reward function R is expressed by a numerical value for each state ID of a transition source, a state s is treated as a discrete space obtained by dividing the whole into n (here, n=8) by dividing the whole into ranges, and transition from an initial state to the state s3 is targeted. Here, an element value of a target vector is 1 in the state s3 and 0 in the other states. Note that, in the present invention, an element value of a vector and a value of the reward function R are referred to as a reward.

The control policy calculation unit 13 calculates an optimum control law (that is, an optimum operation amount) on the basis of the reward function R and the calculated attenuation-type state transition matrix D to calculate a control policy of the control target 20. An example of the control law is illustrated in FIG. 6B. In FIG. 6B, an operation amount ID is expressed by a numerical value for each state ID of a transition source, the state s is treated as a discrete space obtained by dividing the whole into n (here, n=8) by dividing the whole by ranges, and an optimum operation amount ac (c=1, 2, . . . , m) for a range of each state is stored. A method of calculating the optimal operation amount ac will be described later.

An example of a method of calculating an optimal control law is shown below. Here, the control policy calculation unit 13 performs calculation in three stages below to obtain an optimum control law.

Stage 1: First, a function for storing closeness (or a statistical index indicating easiness of transition) between each of the states s and a state s goal as a target in the reward function R is calculated. In the present invention, this function is referred to as a state value function V. Further, the state value function V may be stored in the form of a table, a vector, a matrix, or the like in addition to a function, and a storage format is not limited in the present invention. An example of a calculation method of the state value function V is shown in Equation (3) below.

[Math. 3]

$$V=DR^{tr} \quad (3)$$

As illustrated in Equation (3), the state value function V is a product of the attenuation-type state transition matrix D and $R^{tr}$ that is a transposed matrix of the reward function R. For example, the state value function V is an n-dimensional (here, n=8) vector as illustrated in FIG. 6C. An element value of the state value function V is higher for a state that more easily transitions to the state $s_{goal}$ as a target. In the present invention, this element value is referred to as a value. Further, the state value function V of the present invention is equivalent in value to the definition of a state value function in a reinforcement learning method.

Stage 2: Next, using the state value function V, a state sj* that most easily transitions to the state s goal as a target among the states sj as transition destinations to which a transition can be made from the state si as a transition source is calculated based on each of the states si as a transition source. An example of a method of calculating the state sj* is shown in Equation (4) below.

[Math. 4]

$$sj^*=\text{argmax}(V(sj)T(si,sj)) \quad (4)$$

Here, T(si, sj) is an element value in the row si and the column sj in the state transition probability matrix T. An example of a calculation result of Equation (4) is illustrated in FIG. 6D. In FIG. 6D, a state ID of a transition destination is expressed for each state ID of a transition source.

Stage 3: In the final stage, an operation amount a required to make a transition from each of the states si as a transition source to the state sj* obtained in Stage 2 is calculated. The operation amount a can be calculated by obtaining an inverse model (a model in which the state si as a transition source and the state sj* are input and the corresponding operation amount a is output). As a calculation result of Stage 3, for example, a control law as illustrated in FIG. 6B is obtained.

Calculation of a value with Equation (3) as described above enables evaluation of easiness of transition to s goal of each state, the state sj* that most easily transitions to $s_{goal}$ among states to which transition can be made by a lapse of the time Δt is identified with Equation (4), and the operation amount a for making a transition to the state sj* is identified with the inverse model.

According to the control device 10 of the present embodiment, since the problem segmentation unit 12 that segments a model constructed by the model construction unit 11 is provided, it is possible to reduce memory used for predicting a future state by segmenting the model and predicting the future state. More specifically, memory (for example, memory for storing a model constructed by the model construction unit 11 and memory for storing a model segmented by the problem segmentation unit 12) used for model construction can be reduced by segmentation by the problem segmentation unit 12 as compared with a case where a conventional state transition probability model is constructed. As a result, an effect of reducing memory used in the control device 10 can be expected.

In order to make it easy to check the memory reduction effect, in the present embodiment, the display device 32 preferably further displays a memory use state.

Figure 7:
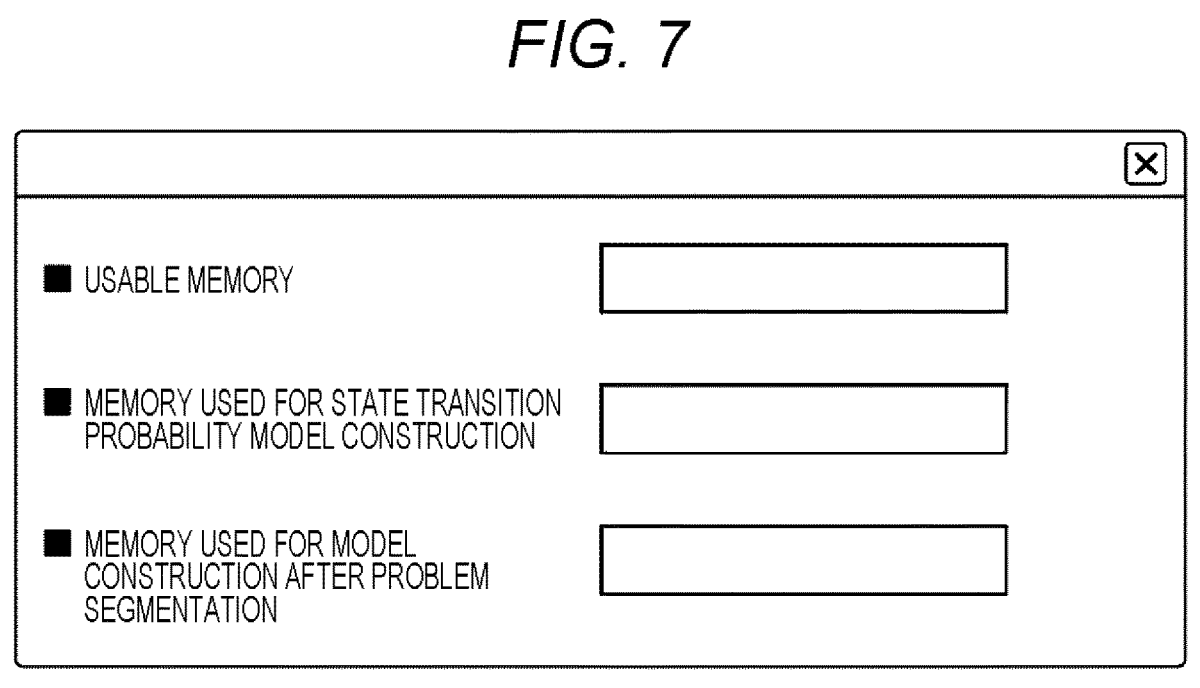

FIG. 7 is an example of a memory use state displayed on the display device. As illustrated in FIG. 7, items such as "usable memory" (that is, memory usable by the control device 10), "memory used for state transition probability model construction", and "memory used for model construction after problem segmentation" are displayed on the display device 32. A specific display result may be, for example, used capacity of each memory or a ratio to the total capacity.

In this way, a use state of each memory can be easily grasped through the display device 32, and a memory reduction effect can be easily checked. Note that the "memory used for state transition probability model construction" here is memory for storing a model constructed by the model construction unit 11, and the "memory used for model construction after problem segmentation" is memory for storing a model segmented by the problem segmentation unit 12.

Further, the display device 32 may optionally display a result obtained by operating the control device 10 of the present embodiment, such as an operation result of an information compression means, the number of clusters, the number of integrated clusters, compression efficiency, the number of joints, and a memory reduction range.

Although the embodiment of the present invention is described in detail above, the present invention is not restricted to the above embodiment, and various design changes can be made without departing from the spirit of the present invention described in the claims.

For example, the control device 10 may further include a display unit. By causing the display unit to display the use states of "usable memory", "memory used for state transition probability model construction", and "memory used for model construction after problem segmentation" described above, and an intermediate result, a final result, and the like obtained by operation of the control device 10, content of these can be easily checked on the control device 10 side.

Furthermore, the control method of the control device may further include a displaying step of displaying the use states of "usable memory", "memory used for state transition probability model construction", and "memory used for model construction after problem segmentation" described above, and an intermediate result, a final result, and the like obtained by operation of the control device 10. For example, the displaying step is added between Step S106 related to operation command generation and Step S107 related to control end determination. In this way, a use state of each memory, an operation result of the control device 10, and the like can be easily grasped.

REFERENCE SIGNS LIST

1 external input signal
2 measurement signal
5 control policy signal
6 operation command
10 control device
11 model construction unit
12 problem segmentation unit
13 control policy calculation unit
14 operation command generation unit
15 measurement signal database
16 processing result database
17 external input interface
18 external output interface
20 control target
21 device
22 device control unit
30 external device
31 external input device
32 display device
151 operation database
152 image database
311 keyboard
312 mouse

The invention claimed is:

1. A control device comprising:
a memory that stores a program; and
a processor that when executing the program configures the processor to:
construct a model that simulates a control target;
segment a model constructed by the processor;
predict a future state of the control target using a model segmented by the processor and calculate a control policy of the control target based on the predicted future state;
generate an operation command to the control target based on a control policy calculated by the processor;
construct the model using an entire characteristic of the control target as a state transition matrix;
segment the state transition matrix; and
control the control target based on the generated operation command.

2. The control device according to claim 1, wherein the processor is further configured to:
define a state of the state transition matrix by discretizing at least one of operation data and image data of the control target using table reference, adaptive resonance theory, or a vector quantization method.

3. The control device according to claim 1, wherein the processor is further configured to:
segment the model constructed by the processor into a plurality of pieces by grouping a plurality of states into one integrated cluster, and further segment the model in a manner that a number of joints coupling integrated clusters is reduced.

4. The control device according to claim 1, further comprising a display unit that displays at least memory used for storing the model constructed by the processor and memory used for storing the model segmented by the processor.

5. A control method comprising:
a model constructing step of constructing a model that simulates a control target;
a segmenting step of segmenting a model constructed by the model constructing step;
a control policy calculating step of predicting a future state of the control target using a model segmented by the segmenting step and calculating a control policy of the control target based on the predicted future state;
an operation command generating step of generating an operation command to the control target based on a control policy calculated by the control policy calculating step; and
a controlling step of controlling the control target based on the generated operation command, wherein
in the model constructing step, the model is constructed using an entire characteristic of the control target as a state transition matrix, and
in the segmenting step, the state transition matrix is segmented.

6. The control method according to claim 5, wherein in the model constructing step, a state of the state transition matrix is defined by discretizing at least one of operation data and image data of the control target using table reference, adaptive resonance theory, or a vector quantization method.

7. The control method according to claim 5, wherein in the segmenting step, the model constructed by the model constructing step is segmented into a plurality of pieces by grouping a plurality of states into one integrated cluster, and further, the model is segmented in a manner that a number of joints coupling integrated clusters is reduced.

8. The control method according to claim 5, further comprising a displaying step for displaying at least memory used for storing the model constructed by the model constructing step and memory used for storing the model segmented by the segmenting step.

* * * * *